United States Patent [19]
Zambell

[11] Patent Number: 5,383,344
[45] Date of Patent: Jan. 24, 1995

[54] STEERING WHEEL LOCK ASSEMBLY

[76] Inventor: Robert G. Zambell, 86-C Wavecrest Ave., Winfield, N.J. 07036

[21] Appl. No.: 69,751

[22] Filed: Jun. 1, 1993

[51] Int. Cl.6 .................. E05B 13/08; B60R 25/02
[52] U.S. Cl. ........................ 70/209; 70/218; 70/455; 70/DIG. 31; 74/552; 292/DIG. 27
[58] Field of Search ............... 70/182-183, 70/187-189, 204, 209, 218, 220, 221-223, 455, DIG. 31, 238, 247, 219; 292/DIG. 27; 74/552

[56] References Cited
U.S. PATENT DOCUMENTS

| 1,087,865 | 2/1914 | Beers | 70/218 |
| 1,239,704 | 9/1917 | Lee et al. | 292/259 |
| 1,255,199 | 2/1918 | Markham | 70/221 |
| 1,332,902 | 3/1920 | Jenson | 70/247 |
| 1,549,568 | 8/1925 | Bates | 70/223 |
| 1,779,438 | 10/1930 | Lowe | 70/222 |
| 1,812,453 | 6/1931 | Smith | 70/204 |
| 1,918,411 | 7/1933 | Lowe | 292/DIG. 27 |
| 3,477,261 | 11/1969 | Siana | 70/455 |
| 4,154,072 | 5/1979 | Flaschar | 70/455 |
| 4,901,544 | 2/1990 | Jang | 74/552 |

FOREIGN PATENT DOCUMENTS

| 603590 | 9/1934 | Germany | 70/223 |
| 306790 | 2/1929 | United Kingdom | 70/238 |

Primary Examiner—Peter M. Cuomo
Assistant Examiner—Darnell M. Boucher
Attorney, Agent, or Firm—E. Michael Combs

[57] ABSTRACT

A mounting hub is arranged for securement orthogonally relative to a steering wheel shaft, such that the mounting hub includes a lock cylinder arranged for rotation of an actuator rod arranged to effect rotating a cam member to project a plurality of lock plates from within an extension tube of the mounting hub for reception of the lock plates within complementary cavities of a steering wheel tubular hub to lock the associated steering wheel relative to the steering wheel shaft.

2 Claims, 4 Drawing Sheets

FIG. 4
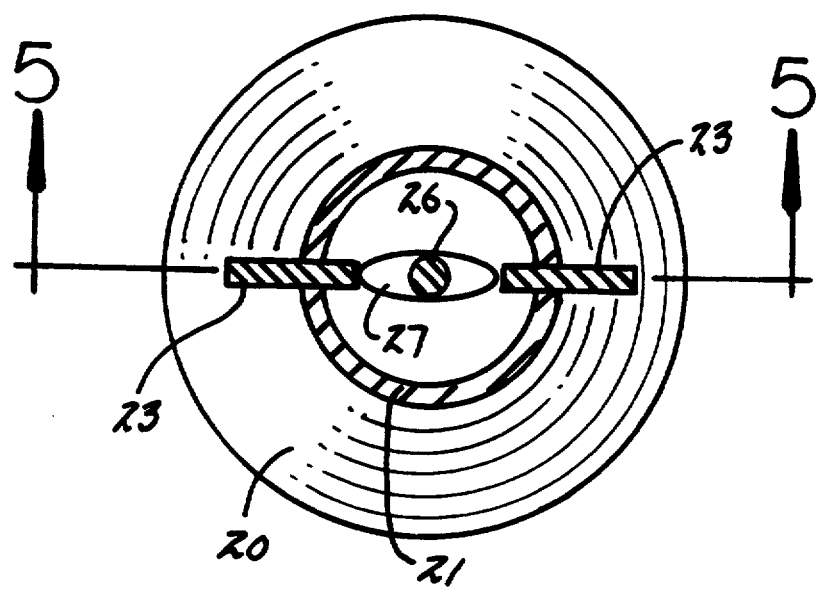
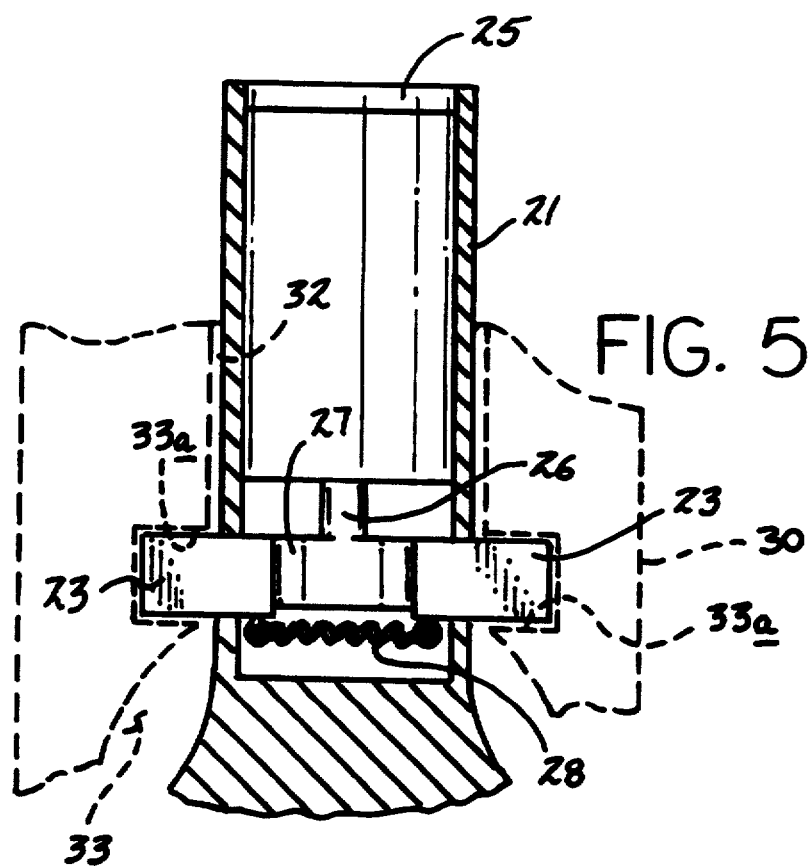
FIG. 5

STEERING WHEEL LOCK ASSEMBLY

BACKGROUND OF THE INVENTION

1. Field of the Invention

The field of invention relates to steering wheel apparatus, and more particularly pertains to a new and improved steering wheel lock assembly to effect selective locking engagement of a steering wheel relative to a steering wheel shaft.

2. Description of the Prior Art

Steering wheel locks of various types are utilized throughout the prior art and such structure is exemplified in the U.S. Pat. Nos. 4,881,389; 4,984,481; 5,052,201; and 4,659,244.

The instant invention attempts to overcome deficiencies of the prior art by providing for an efficient locking structure oriented for ease of use as well as effectiveness in construction in permitting the selective latching of a steering wheel relative to the steering wheel shaft and disengagement of the steering wheel relative to the steering wheel shaft and in this respect, the present invention substantially fulfills this need.

SUMMARY OF THE INVENTION

In view of the foregoing disadvantages inherent in the known types of steering wheel lock apparatus now present in the prior art, the present invention provides a steering wheel lock assembly wherein the same is directed to the selective latching and unlatching of a steering wheel relative to a steering wheel shaft and column structure. As such, the general purpose of the present invention, which will be described subsequently in greater detail, is to provide a new and improved steering wheel lock assembly which has all the advantages of the prior art steering wheel lock apparatus and none of the disadvantages.

To attain this, the present invention provides a mounting hub arranged for securement orthogonally relative to a steering wheel shaft, such that the mounting hub includes a lock cylinder arranged for rotation of an actuator rod arranged to effect rotating a cam member to project a plurality of lock plates from within an extension tube of the mounting hub for reception of the lock plates within complementary cavities of a steering wheel tubular hub to lock the associated steering wheel relative to the steering wheel shaft.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved steering wheel lock assembly which has all the advantages of the prior art steering wheel lock apparatus and none of the disadvantages.

It is another object of the present invention to provide a new and improved steering wheel lock assembly which may be easily and efficiently manufactured and marketed.

It is a further object of the present invention to provide a new and improved steering wheel lock assembly which is of a durable and reliable construction.

An even further object of the present invention is to provide a new and improved steering wheel lock assembly which is susceptible of a low cost of manufacture with regard to both materials and labor, and which accordingly is then susceptible of low prices of sale to the consuming public, thereby making such steering wheel lock assemblies economically available to the buying public.

Still yet another object of the present invention is to provide a new and improved steering wheel lock assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic view, taken along the lines 4—4 of FIG. 3 in the direction indicated by the arrows.

FIG. 5 is an orthographic view, taken along the lines 5—5 of FIG. 4 in the direction indicated by the arrows.

DESCRIPTION OF THE PREFERRED EMBODIMENT

Figure 1:
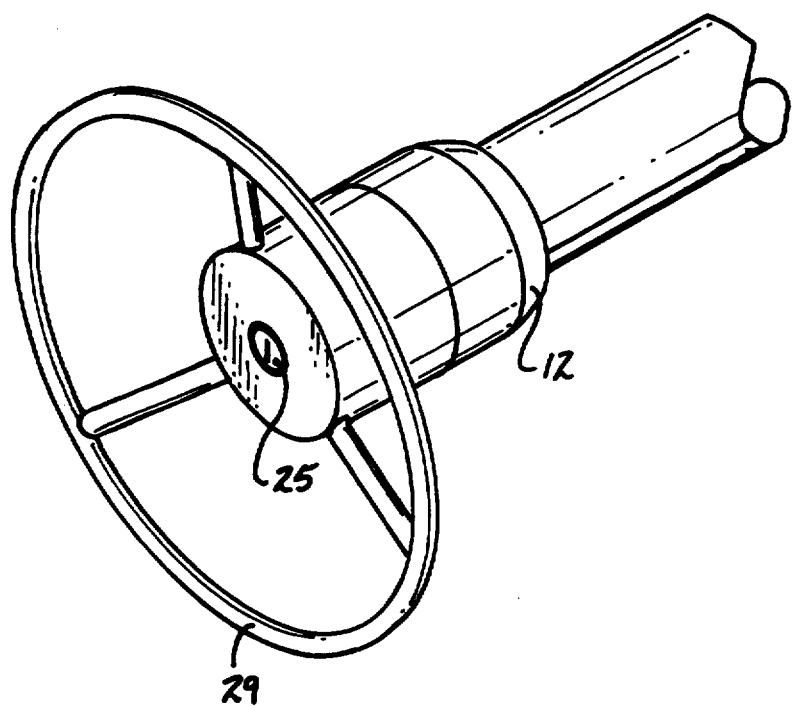
FIG. 1 is an isometric illustration of the invention.
Figure 2:
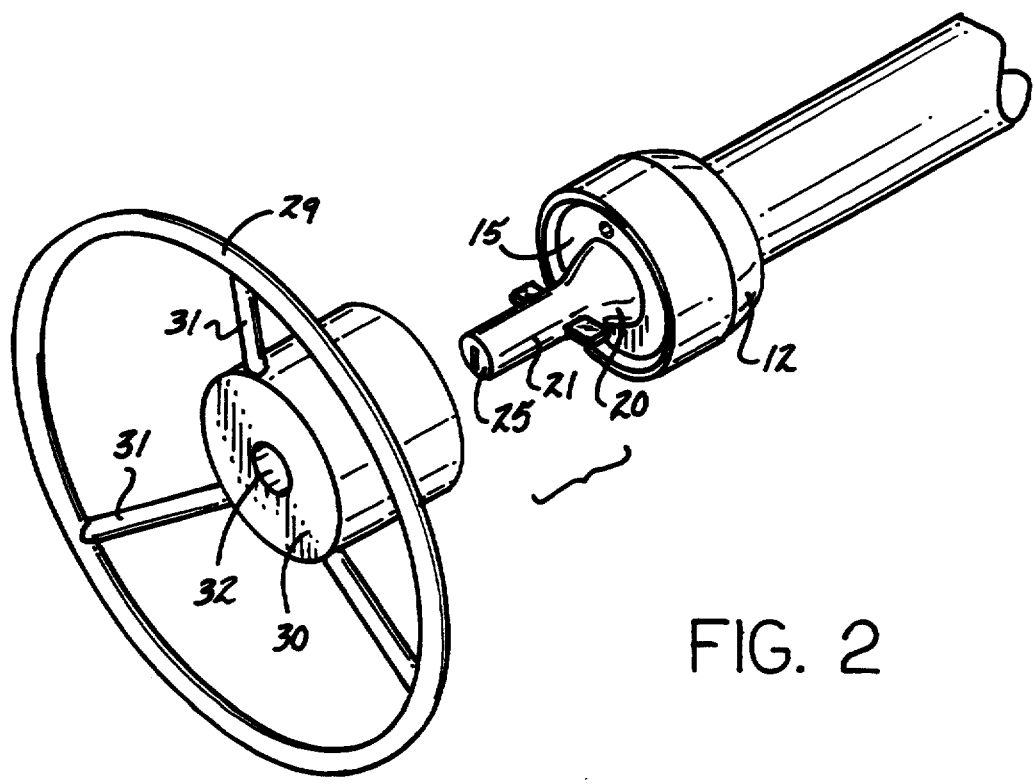
FIG. 2 is an isometric illustration of the invention indicating the steering wheel hub separated relative to the steering wheel column structure.
Figure 3:
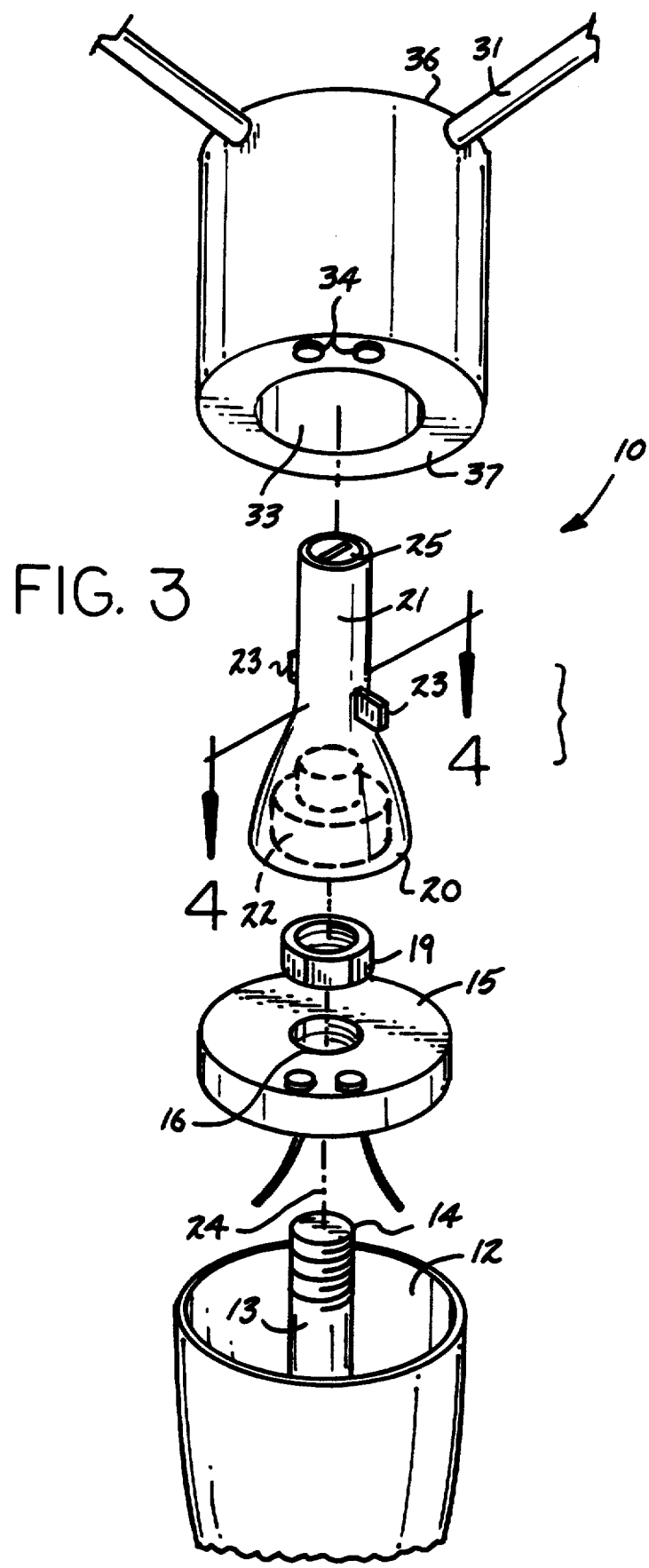
FIG. 3 is an isometric illustration, in an exploded view, of the invention.

With reference now to the drawings, and in particular to FIGS. 1 to 7 thereof, a new and improved steering wheel lock assembly embodying the principles and concepts of the present invention and generally designated by the reference numeral 10 will be described.

Figure 6:
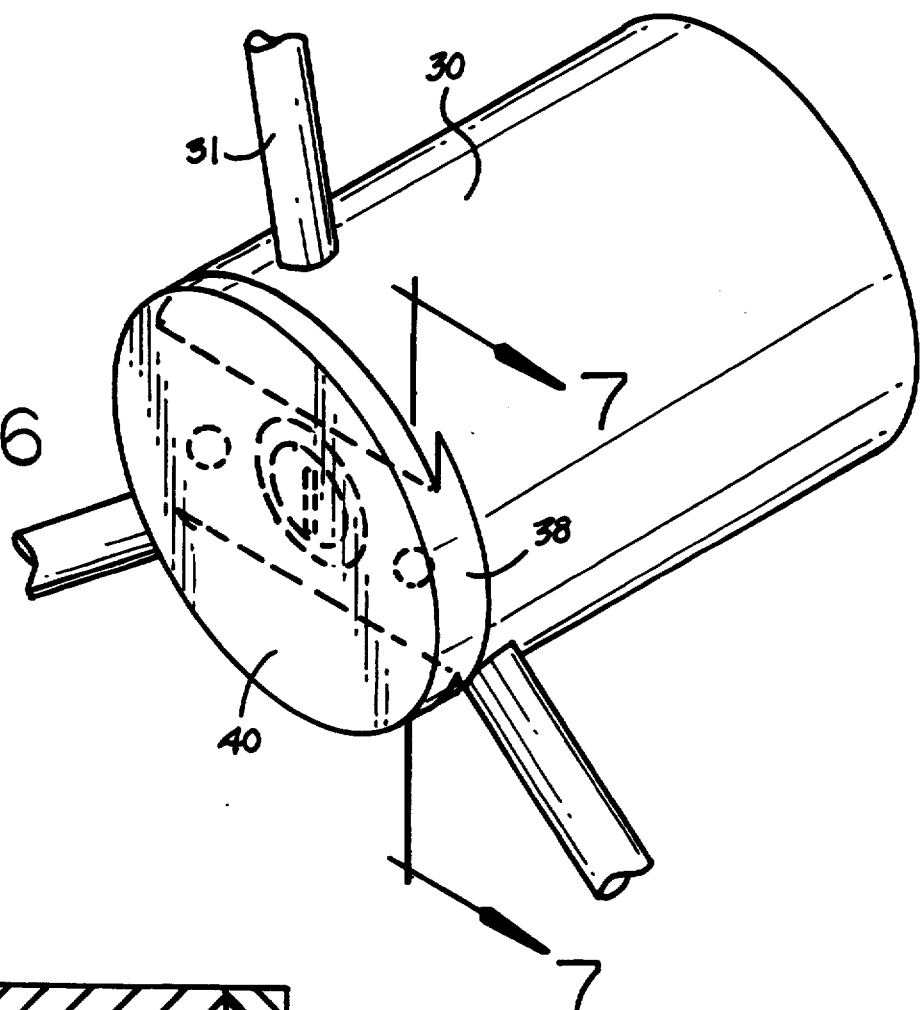
FIG. 6 is an isometric illustration of a cover cap structure for the steering wheel hub.
Figure 7:
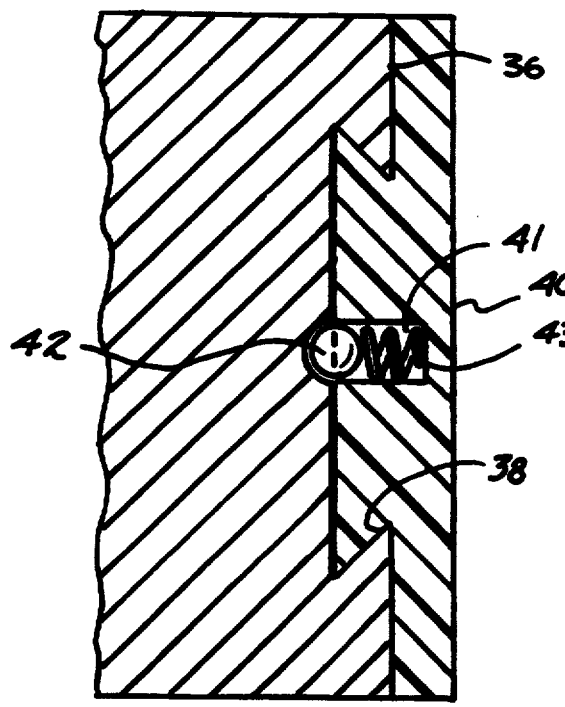
FIG. 7 is an orthographic view, taken along the lines 7—7 of FIG. 6 in the direction indicated by the arrows.

More specifically, the steering wheel lock assembly 10 of the instant invention comprises a steering wheel support tube 12, having a steering wheel shaft 13 directed therethrough in a rotative relationship in a manner known in the prior art, such that the shaft 13 includes a shaft threaded end portion 14. A mounting plate 15 is provided having a mounting plate threaded central bore 16 arranged for threaded securement to the shaft threaded end portion 14, wherein an internally threaded Lock fastener 19 is mounted onto the shaft threaded end portion 14 to secure and lock the mounting plate 15 relative to the steering shaft 13. A mounting hub 20 is provided, having a mounting hub extension tube 21 extending therefrom, with the mounting hub 20, the extension tube 21, and the steering wheel 13 coaxially aligned along the axis 24. The mounting hub includes a mounting hub cavity 22 directed into a first end 25 of the mounting hub, with a plurality of lock plates 23 orthogonally oriented relative to the axis 24 and arranged for reciprocation relative to the mounting hub extension tube 21, that are in turn reciprocatable and in orthogonal orientation relative to the axis 24. A lock cylinder 25 having a lock cylinder actuator rod 26 (see FIGS. 4 and 5 for example) is arranged such that rotation of the actuator rod 26 by manipulation of the lock cylinder 25 by a key and the like, in a manner known in the art relative to lock cylinders and key operated lock cylinders, effects selective rotation of the actuator rod 26 that includes a cam member 27 oriented between the lock plates 23 such that the lock plates 23 are biased towards one another by a spring member 28, whereupon rotation of the cam member 27 to the first position effects projection of the lock plates 23 into associated hub cavity lock plate cavities 33a directed into the steering wheels tubular hub 23 directed from a first end 37 of the steering wheel tubular hub 30 that mounts the steering wheel 29 thereto. The steering wheel 29 includes a plurality of steering wheel spokes 31 projecting radially towards the steering wheel hub 30 for securement of the steering wheel to the hub structure. A hub bore 32 is directed into the hub and coaxially aligned with the axis 24 and receives the mounting hub extension tube 21 therethrough. The steering wheel hub 30 includes a hub annular second end 36, with the hub first end and the hub second end orthogonally oriented relative to the axis 24, with the hub second end having a plurality of dovetail recesses 38, as indicated in FIGS. 6 and 7, arranged to receive dovetail projections 39 of an associated cover cap 40. The cover cap 40, and more specifically each of the dovetail projections 39, is arranged with a dovetail projection cavity 41 having an anti-rattle spring 43 biasing a sphere 42 into engagement with the associated dovetail recess 38 maintaining an anti-rattle engagement of the cap structure 40 relative to the steering wheel hub 30.

It should be noted that the mounting hub cavity 22 of the mounting hub 20 is arranged to complementarily receive the lock fastener 19 in a fixed communication to provide fixed securement of the mounting hub 20 relative to the steering shaft 13, whereupon disengagement of the lock plates 23 operatively disassociates the steering shaft relative to the steering wheel hub 30.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A steering wheel lock assembly, comprising, a steering wheel support tube, having a steering wheel shaft rotatably directed through the support tube, with the steering wheel shaft including a shaft threaded end portion protecting beyond the support tube, with the shaft coaxially aligned along a predetermined axis, with a mounting plate having a mounting plate central bore arranged for engagement with the steering wheel shaft threaded end portion, the mounting plate orthogonally oriented relative to the predetermined axis, with a mounting hub having a mounting hub extension tube coaxially aligned along the predetermined axis, with the mounting hub having a mounting hub first end and a mounting hub second end, the mounting hub first end including a mounting hub cavity directed into the mounting hub through the mounting hub first end receiving the mounting hub cavity fixedly secured relative to the steering wheel shaft, and a steering wheel hub mounting a steering wheel about the steering wheel hub, with the steering wheel including a steering wheel hub cavity receiving the mounting hub and the extension tube therewithin, with the mounting hub cavity including mounting hub cavity lock plate cavities, with the lock plate cavities in communication with the locking means mounted to the mounting hub extension tube for selective locking of the mounting hub extension tube to the steering wheel hub, the lock means includes a plurality of lock plates orthogonally oriented relative to the predetermined axis, with the lock plates reciprocatably received within the mounting hub extension tube, and a lock tumbler rotatably mounted within the mounting hub extension tube, having a lock tumbler actuator rod, the actuator rod includes a cam member fixedly mounted to the actuator rod, with the cam member oriented between the lock plates in contiguous communication with the lock plates, whereupon rotation of the cam member effects selective reciprocation of the lock plates relative to the mounting hub for selective reception within the lock plate cavities, and a spring member directed between the lock plates to maintain the lock plates in biased orientation relative to one another.

2. An assembly as set forth in claim 1 wherein the steering wheel hub includes a steering wheel hub second end and a steering wheel hub first end, the steering wheel hub first end receives the mounting hub, wherein the steering wheel hub second end includes at least one dovetail recess, and a cap member having a cap member projection of dovetail configuration complementarily received within said dovetail recess, and the dovetail projection having a projection cavity, the projection cavity including an anti-rattle spring, and a sphere protecting from the dovetail projection for communication with the hub second end maintaining anti-rattle association of the cap with the steering wheel hub.

* * * * *